United States Patent [19]
Nakahara

[11] Patent Number: 5,941,961
[45] Date of Patent: Aug. 24, 1999

[54] DATA BUFFERING SYSTEM INCLUDING BUFFER MEMORY SHARED BETWEEN CHANNEL DATA GROUPS WHEREAS BUFFER MEMORY IS DIVIDED INTO MEMORY AREAS FOR STORING DIFFERENT TYPES OF CHANNEL DATA GROUPS

[75] Inventor: Masanao Nakahara, Kanagawa, Japan

[73] Assignee: NEC Corporation, Tokyo, Japan

[21] Appl. No.: 08/910,119

[22] Filed: Aug. 13, 1997

[30] Foreign Application Priority Data

Aug. 16, 1996 [JP] Japan .................................. 8-216279

[51] Int. Cl.[6] .......................... G06F 15/167; G06F 12/00
[52] U.S. Cl. ................................ 710/52; 710/53; 710/54; 710/56; 711/147; 711/148; 711/153; 711/170
[58] Field of Search .................................... 395/872, 873, 395/874, 876; 711/170, 147, 148, 153

[56] References Cited

U.S. PATENT DOCUMENTS 5,706,432  1/1998  Elko et al. ......................... 395/200.08
5,838,994  11/1998  Valizadeh ................................. 395/876

*Primary Examiner*—Thomas C. Lee
*Assistant Examiner*—Rehana Perveen
*Attorney, Agent, or Firm*—Young & Thompson

[57] ABSTRACT

A plurality of channel data groups and a coupling data group are supplied to a data input port of a data buffering apparatus so as to be temporarily stored in a buffering memory having a first memory area assigned to a non-coupled channel data group, a second memory area assigned to a coupled channel data group and a third memory area assigned to the coupling data group, and the data buffering apparatus outputs the channel data group from the first memory area or the channel data group and the coupling data group from the second and third memory areas before the next channel data group arrives at the data input port so as to decrease the memory areas of the buffer memory.

8 Claims, 4 Drawing Sheets

DATA BUFFERING SYSTEM INCLUDING BUFFER MEMORY SHARED BETWEEN CHANNEL DATA GROUPS WHEREAS BUFFER MEMORY IS DIVIDED INTO MEMORY AREAS FOR STORING DIFFERENT TYPES OF CHANNEL DATA GROUPS

FIELD OF THE INVENTION

This invention relates to a data buffering apparatus and, more particularly, to a data buffering apparatus equipped with a small buffer memory shared between channel data groups.

DESCRIPTION OF THE RELATED ART

A typical example of data buffering apparatus for pieces of sound data information is hereinbelow described with reference to FIGS. 1A and 1B of the drawing. FIG. 1A illustrates a data format for sound data groups without a coupling channel, and the data format contains a first area 11 assigned to a sound data group L for a left channel, a second area 12 assigned to a sound data group C for a center channel, a third area 13 assigned to a sound data group R for a right channel, a fourth area 14 assigned to a sound data group SL for a surround left channel, a fifth area 15 assigned to a sound data group SR for a surround right channel and a sixth area 16 assigned to a sound data group LFE for a bass channel. The sound/sound data groups L to LFE supplied to the prior art data buffering apparatus have been compressed, and are successively processed from the leftmost sound data group L to the rightmost sound data group LFE after a data expansion. Each of the sound data groups L/C/R and the sound data groups SL to LFE are hereinbelow referred to as "channel data" group.

Thus, a piece of sound data information is represented by the channel data groups L to LFE respectively assigned the first area 11 to the sixth area 16. However, the prior art data format shown in FIG. 1A requires a large buffer memory. A high-frequency data component for a certain channel tends to be analogous to a high-frequency data component for another channel. In this situation, if an analogous data component is shared between the channels as a coupling channel data component, the coupling channel data component decreases the amount of memory area to be required. A channel assigned to a channel data group containing a coupling channel data component is referred to as "coupling channel", and channels are "coupled" by means of a coupling channel data component. If a channel data group for a certain channel contain a coupling channel data component, the channel data group is hereinbelow referred to as "coupled channel data group". On the other hand, if a channel data group for a certain channel does not contain a coupling data component, the channel data group is called as "non-coupled channel data group".

In order to effectively couple some channels, it is recommendable to selectively examine the channel data groups. A high-frequency data component for the left channel may be coupled with a corresponding high-frequency data component for the right channel, or a data component for the center channel may be coupled with a corresponding data component for the surround left channel and a corresponding data component for the surround right channel. In this way, when the channel data groups L to LFE are selectively examined to see whether or not a coupling data component is incorporated in the channel data groups. Moreover, a high-frequency data component between certain channel groups may be different from a high-frequency data component between other channel groups so as to find coupling data components as many as possible.

Subsequently, description is made on the behavior of the prior art data buffering apparatus with reference to FIGS. 1B, 2 and 3, and a coupling data component is shared between the channel data group L and the channel data group R. FIG. 1B illustrates the data areas 11 to 16 assigned the channel data groups L to LFE containing a coupling channel data component. The channel data groups L to LFE have been compressed, and are assigned the first area 11 to the sixth area 16. In this instance, a coupling data component couples the channel data group L for the left channel with the channel data group R for the right channel, and is incorporated in a coupling data group CPL assigned an area 17. The area 17 is provided immediately after the area 11 assigned the first coupled channel data group L.

The compressed channel data groups L to LFE are supplied to the prior art data buffering apparatus and the prior art data buffering apparatus successively examines the data groups from L toward LFE.

The channel data group L is firstly examined by the prior art data buffering apparatus as by step S1. The prior art data buffering apparatus expands the channel data group L, and, thereafter, stores the channel data group L into a buffer memory 20 as by step S2.

The buffer memory 20 has a plurality of memory areas 21 to 27, and each memory area is constituted by 256 words. The memory areas 21 to 26 are assigned to the channel data groups L to LFE, respectively, and the channel data group L is stored in the memory area 21. In this way, when the prior art data buffering apparatus receives one of the channel data groups L, C, R, SL, SR and LFE, the channel data group is stored in the memory area assigned thereto.

However, when the prior art data buffering apparatus determines the received data to be the coupled data group CPL, the coupling data group CPL is treated by the prior art data buffering apparatus as follows. The prior art data buffering apparatus discriminates the coupling data group CPL from the channel data groups L, C-LFE, and checks the expanded data group whether the coupling channel data component indicates the first coupling channel as by step S3. When the answer at step S3 is given affirmative, the coupling data group CPL is expanded, and is stored in the predetermined memory area of the buffer memory 20 as by step S4.

Thus, the left channel is determined to be the coupling channel at step S3, and the coupling channel data component is expanded and stored in the memory area 27 at step S4.

On the other hand, if the data group is not for a coupling channel or the coupling channel data component has been already stored in the predetermined area of the buffer memory 20, the prior art data buffering apparatus checks the buffer memory 20 to see whether or not the data groups for all the channels have been already stored therein as by step S5. In this way, the prior art data buffering apparatus repeats the loop consisting of steps S2 to S5 until the channel data group LFE is stored in the memory area 26. When the prior art data buffering apparatus determines that all of the channel data groups have been stored in the buffer memory 20, the data processing is carried out for the next channel as by step S6.

As described hereinbefore, each of the memory areas 21 to 27 consists of 256 words. The channel data components are expressed by using the common logarithms in the form of a characteristic plus mantissa, and the mantissa relates to a coupling data component. The memory areas 21 to 27 are constant in length regardless of the magnitude of the loudness expressed by the data group.

In the sound data processing, final sound data are restored from the channel data groups L to LFE. A sound processor, by way of example, processes the data groups for transfer to an output port or a sound mixer (not shown), and the coupled channel data group contains pieces of control data information for these processing. In order to properly address the channel data components in the memory areas 21 to 27, the address of each mantissa is matched with the address of the coupling data component, and each memory area 21 to 27 requires the total of the data length of channel data group and the data length for the mantissa. For this reason, the memory areas 21 to 27 are designed to store a channel data group having the constant data length. However, the actual channel data do not always occupy the entire memory area 21 . . . 27, and the large buffer memory is wasteful.

Moreover, the prior art data buffering apparatus firstly expands all the channel data groups and the coupling data group, and stores the expanded data groups into the buffer memory 20. Thereafter, the expanded data groups are transferred to a sound processor. For this reason, the prior art buffer memory 20 requires the memory areas equal in number to the expanded data groups, and the prior art data buffering apparatus is high in production cost due to the large buffer memory 20. This is the problem inherent in the prior art data buffering apparatus.

SUMMARY OF THE INVENTION

It is therefore an important object of the present invention to provide a data buffering apparatus a buffer memory of which is optimized between a non-coupled channel data group, a coupling data component of a coupled channel data group and a non-coupling data component of the coupled channel data group.

It is also an important object of the present invention to provide a method of controlling the data buffering apparatus.

To accomplish the objects, the present invention proposes to share a memory area between different data groups.

In accordance with one aspect of the present invention, there is provided a data buffering apparatus for temporarily storing a plurality of channel data groups each having a plurality of channel data components representative of pieces of data information and a coupling channel data group having a coupling data component representative of one of the pieces of data information shared between at least two of the plurality of channel data groups and at least one control data component representative of a piece of control data information used for the coupling data component; the data buffering apparatus comprises a data input port for successively receiving the plurality of channel data groups and the coupling data group, a buffer memory having a first memory area assigned to one of the plurality of channel data groups without the coupling data component, a second memory area assigned to another of the plurality of channel data groups having channel data components selected from the plurality of channel data components in such a manner as to delete the coupling data component from the plurality of channel data components and a third memory area assigned to the coupling data group, and a data controlling means connected between the data input port and the buffer memory, checking each of the plurality of channel data groups to see whether or not the coupling data component is incorporated therein so as to write the aforesaid each of the plurality of channel data group into one of the first memory area and the second memory area, and writing the coupling data group into the third memory area; the data controlling means overwrites yet another of the plurality of channel data groups into the first area already stored the aforesaid one of the plurality of channel data groups when the aforesaid yet another of the plurality of channel data groups does not contain the coupling data component and the data controlling means overwrites still another of the plurality of channel data groups into the second memory area already stored the aforesaid another of the plurality of channel data groups when the still another of the plurality of channel data groups contains the coupling data component.

In accordance with another aspect of the present invention, there is provided a method of controlling a data buffering apparatus for temporarily storing a plurality of channel data groups each having a plurality of channel data components representative of pieces of data information and a coupling channel data group having a coupling data component representative of one of the pieces of data information shared between at least two of the plurality of channel data groups and at least one control data component representative of a piece of control data information used for the coupling data component; and the method comprises the steps of a) discriminating one of the plurality of channel data groups without the coupling data component, another of the plurality of channel data groups with the coupling data component and the coupling data group from the others, b) writing the aforesaid one of the plurality of channel data groups into a first memory area assigned to a channel data group without the coupling data component, a second memory area assigned to a channel data group with the coupling data component or a third memory area assigned to the coupling data group depending upon the discrimination at step a), c) repeating the steps a) and b) until the aforesaid one of the plurality of channel data groups is written into the first memory area or the aforesaid one of the channel data groups and the coupling data group are written into the second memory area and the third memory area, respectively, d) reading out the aforesaid one of the plurality of channel data groups from the first memory area or the aforesaid one of the plurality of channel data groups and the coupling data group from the second memory area and the third memory area, and e) repeating the step a), and overwriting the aforesaid one of the plurality of channel data groups into the first memory area, the second memory area or the third memory area depending upon the discrimination at step e).

BRIEF DESCRIPTION OF THE DRAWINGS

The features and advantages of the data buffering apparatus will be more clearly understood from the following description taken in conjunction with the accompanying drawings in which.

DESCRIPTION OF THE PREFERRED EMBODIMENT

Figure 4:
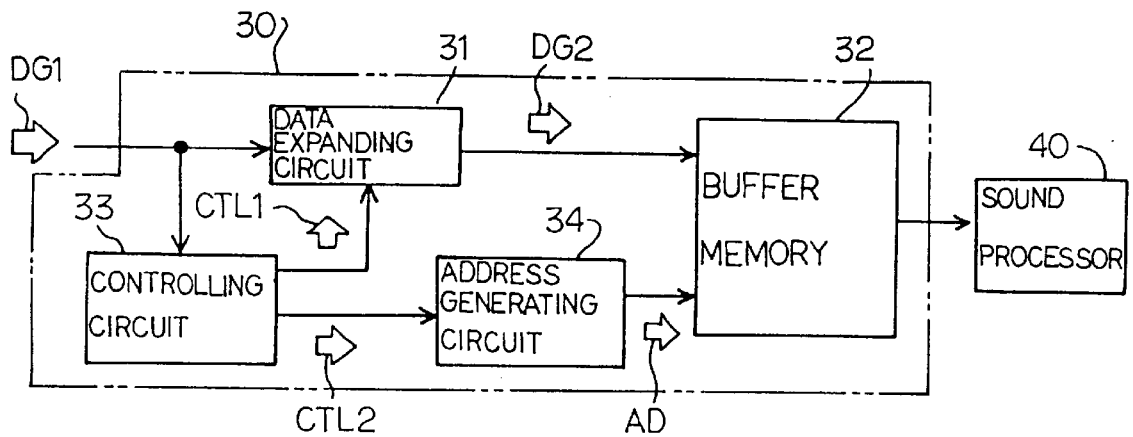
FIG. 4 is a block diagram showing the arrangement of a data buffering apparatus according to the present invention.

Referring to FIG. 4 of the drawings, a data buffering apparatus 30 embodying the present invention comprises a data expanding circuit 31, a buffer memory 32 and a controlling circuit 33. A compressed data group DG1 is supplied to the data expanding circuit 31 and the controlling circuit 33, and the data expanding circuit 31 selectively expands channel data components of the compressed data group DG1 in cooperation with the controlling circuit 33. In the following description, the data buffering apparatus 30 is assumed to store the channel data group L to the channel data group LFE, and the compressed data group DG1 stands for each of the channel data groups L to LFE or a coupling data group CPL.

The coupling data group includes at least one coupling data component shared between different channel data groups and control data components. The control data components are representative of the volume of the coupling data group and the identity codes of the coupled channel data groups and so fourth.

The channel data groups L to LFE are broken down into two categories as similar to those supplied to the prior art data buffering apparatus. The first categories is called as a non-coupled channel data group having a plurality of channel data components. In this instance, two hundred fifty-six channel data components are incorporated in the non-coupled channel data group. The channel data component represents a kind of sound data information. The second categories is a coupled channel data group. Although the coupled channel data group contains at least one coupling channel data component, the coupling data component or components are deleted from the coupled channel data group, and the coupled channel data group has (256 channel data components—coupling data component(s)). The coupling channel data component is one of the two hundred fifty-six channel data components, and represents a kind of sound data information.

The channel data components have been selectively compressed before the transfer to the data buffer apparatus. When the amount of a channel data component is expected to be decreased through a data compression, the channel data component has been compressed. However, if not, the channel data component have not been compressed. For this reason, compressed data components and non-compressed data components are mixed in the compressed data group DG1.

When the compressed data group DG1 arrives at the controlling circuit 33 and the data expanding circuit 31, the controlling circuit 33 checks the compressed data group DG1 to see whether or not the compressed data component is incorporated therein. When the controlling circuit 33 finds a compressed data component in the compressed data group DG1, the controlling circuit 33 produces a control signal CTL1 representative of existence of the compressed data component, and the control signal CTL1 is supplied from the controlling circuit 33 to the data expanding circuit 31. The data expanding circuit 31 is responsive to the control signal CTL1 so as to expand the compressed data component.

After the data expansion, the expanded channel data group DG2 is transferred from the data expanding circuit 31 to the buffer memory 32, and is stored therein.

The data buffering apparatus further comprises an address generating circuit 34. In this instance, the data expanding circuit 31, the controlling circuit 33 and the address generating circuit 34 as a whole constitute a data controlling means.

When the compressed data group DG1 arrives at the controlling circuit 33, the controlling circuit 33 further produces a control signal CTL2 representative of the category of the compressed data group DG1, and the control signal CTL2 is supplied to the address generating circuit 34. The address generating circuit 34 generates an address signal AD so as to assign a memory location to the expanded channel data group DG2. The address signal AD is supplied to the buffer memory 32. The buffer memory 32 stores the expanded channel data group DG2 in the memory location assigned thereto in response to the address signal AD.

Figure 5:
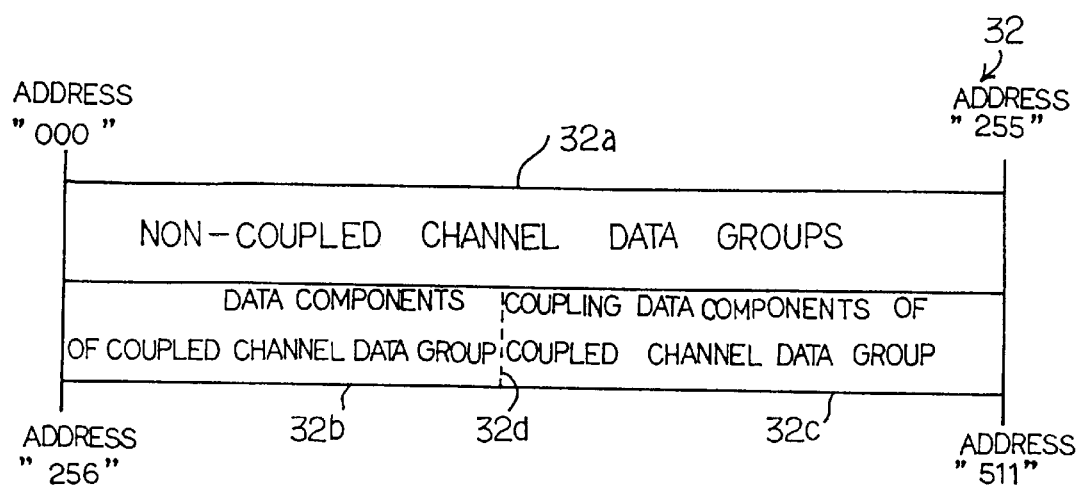
FIG. 5 is a view showing a memory map created in a buffer memory incorporated in the data buffering apparatus.
Figure 6:
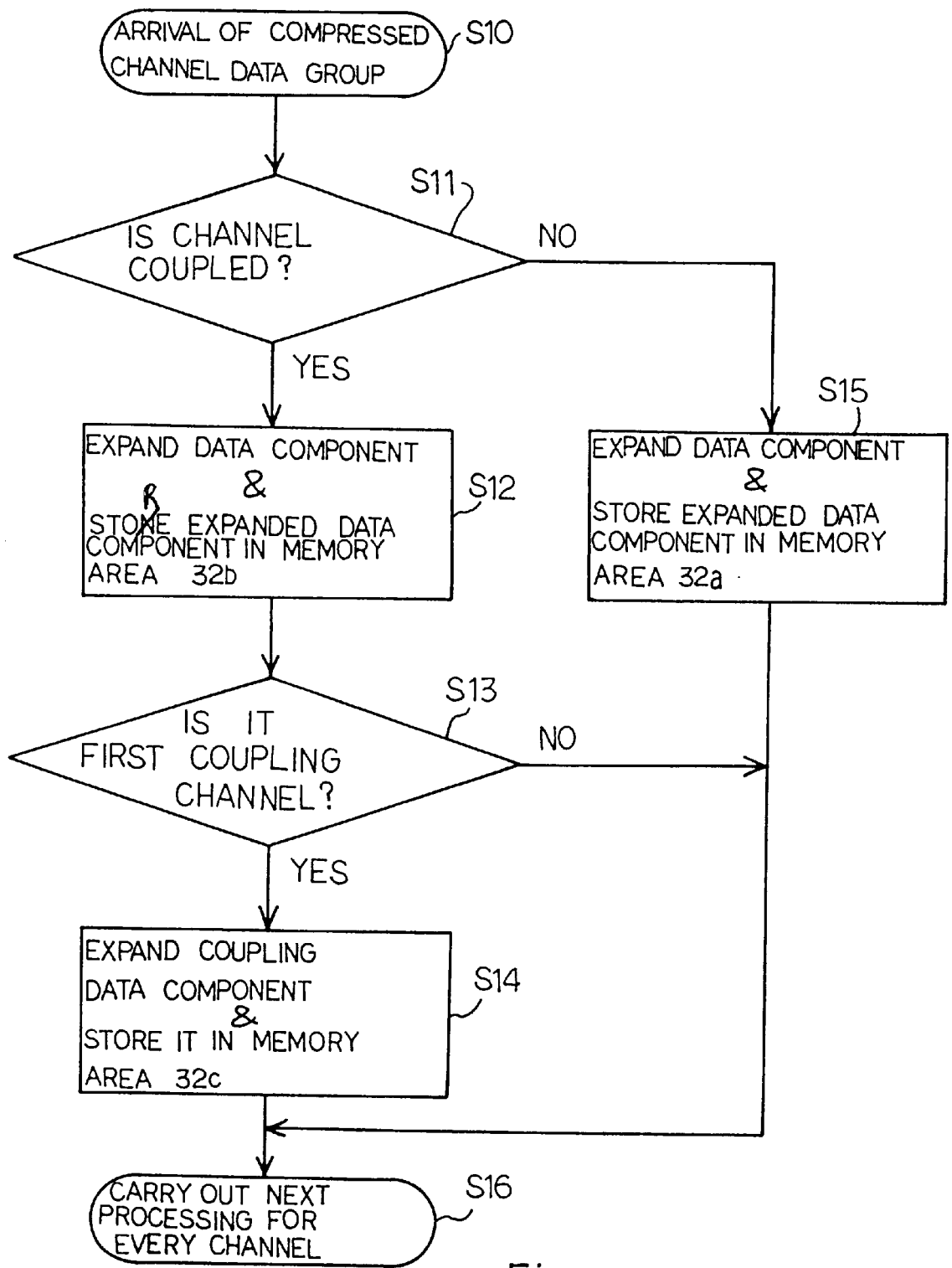
FIG. 6 is a flow chart showing a control sequence executed by the data buffering apparatus.

FIG. 5 illustrates a memory map created in the buffer memory 32, and the memory map is created on the assumption that 256 sampled data components form in combination each channel data group. The buffer memory 32 contains a first memory area 32a assigned to each of the non-coupled channel data groups, a second memory area 32b assigned to the channel data components of each coupled channel data group and a third memory area 32c assigned to the coupling data components of the coupled channel data group. The memory area 32a of each non-coupled channel data group is equal in data length to the total of the memory areas 32b and 32c for each coupled channel data group. The number of coupling channel data components is not constant, and, for this reason, the boundary 32d between the memory areas 32b and 32c is variable depending upon the contents of the channel data group. Thus, the coupling data components of a certain coupled channel data group and the channel data components of the certain coupled channel data group are selectively stored in the second memory area 32b and the third memory area 32c, and the address signal AD represents an address between the lowest address of the memory area 32b and the highest address of the memory area 32c or an address between the lowest address and the highest address of the memory area 32a depending upon the category of the channel data group.

The buffer memory 32 is connected to a sound processor 40, and the channel data groups L to LFE are supplied from the buffer memory 32 to the sound processor 40.

Figure 3:
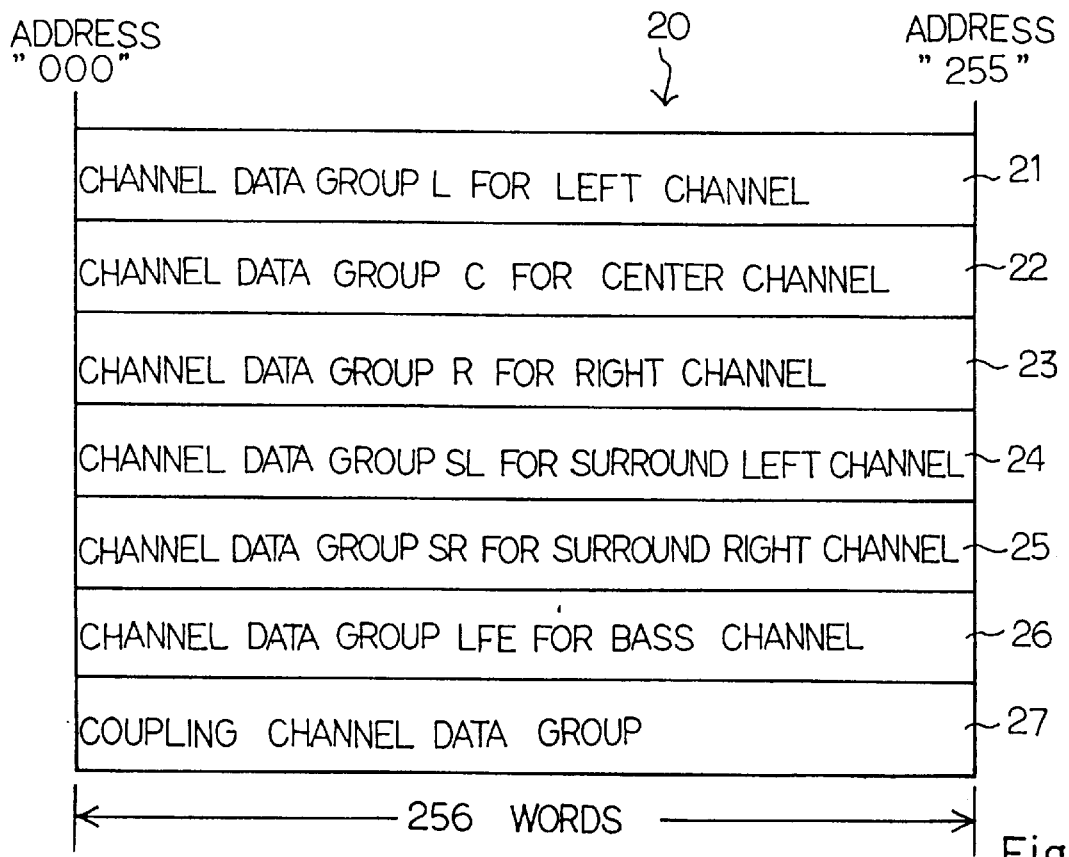
FIG. 3 is a view showing the memory map created in the buffer memory incorporated in the prior art data buffering apparatus.
Figure 2:
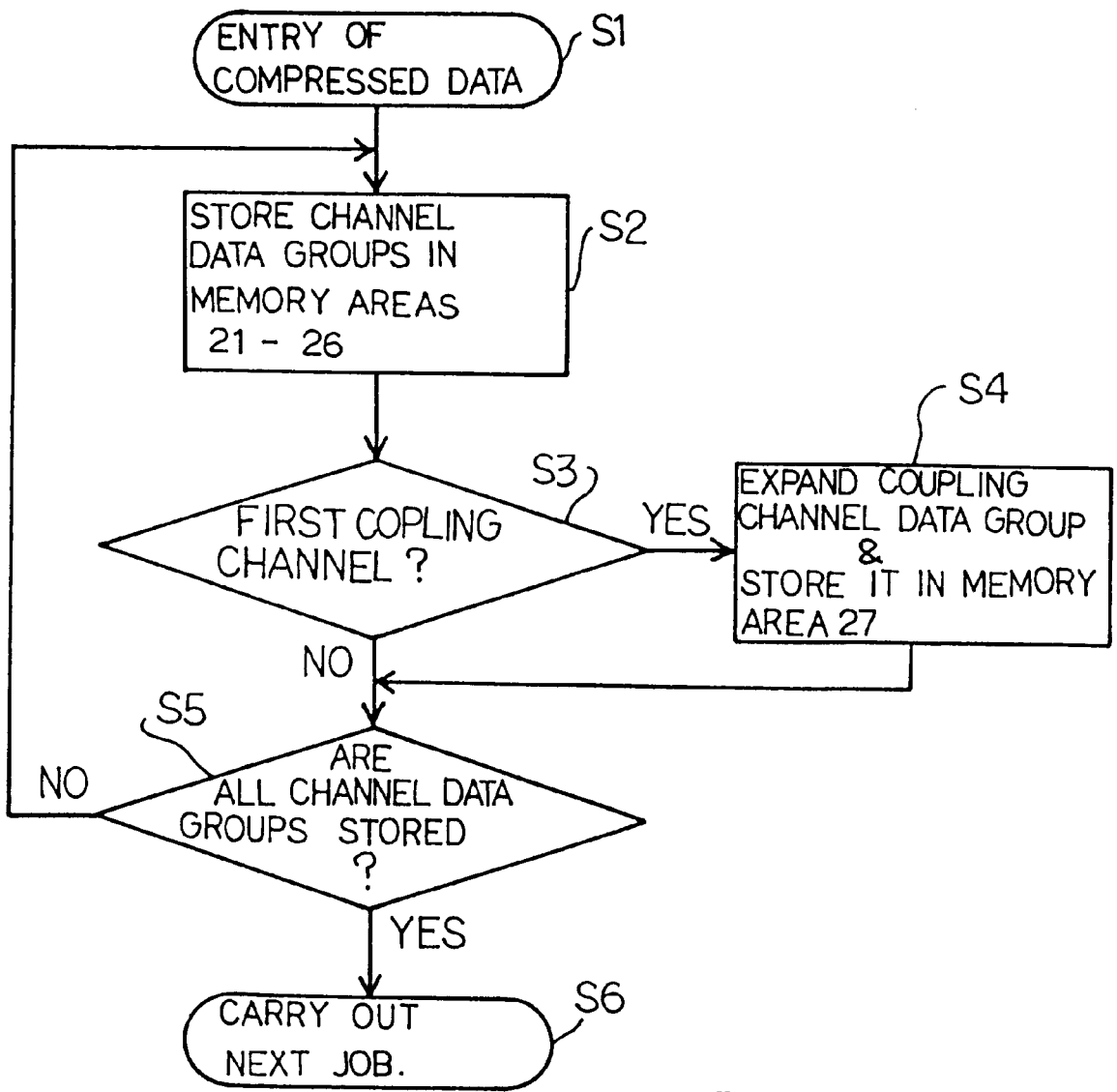
FIG. 2 is a flow chart showing the control sequence executed by the prior art data buffering apparatus.

Subsequently, description is made on a method of controlling the data buffering apparatus with reference to FIG. 3. FIG. 3 illustrates a flow chart illustrating a control sequence.

First, the compressed data group DG1 arrives at the data expanding circuit 31 and the controlling circuit 33 as by step S10, and the compressed data group DG1 contains coupling data components. The controlling circuit 33 checks the compressed data group DG1 to see whether or not the channel for a compressed data component is coupled to any channel as by step S11. If the channel for the compressed data component is coupled to another channel, the data expanding circuit 31 expands the compressed data component, and the expanded data component is stored in the memory area 32b. In this way, the expanded data components are stored from a lower address toward a higher address.

At step S13, the controlling circuit 33 checks the coupled channel data group to see whether or not the channel for the data group is the first coupling channel as by step S13. If the channel is the first coupling channel, the data expanding circuit 31 expands the coupling data component, and stores it in the area 32c. In this way, the coupling data components are stored in the memory area 32c from a higher address toward a lower address.

When the channel for the compressed data component is not coupled with another channel, the data expanding circuit 31 expands the compressed data component, and the expanded data component is stored in the memory area 32a as by step S15. In this way, the data components of the non-coupled channel data group are stored in the memory area 32a from a lower address toward a higher address.

When the data components for one of the channels are stored in the buffer memory 32, a data output or a mixing is carried out at step S16.

When the process for one channel is completed, the above described processing is carried out for the other channels.

Figure 1A:
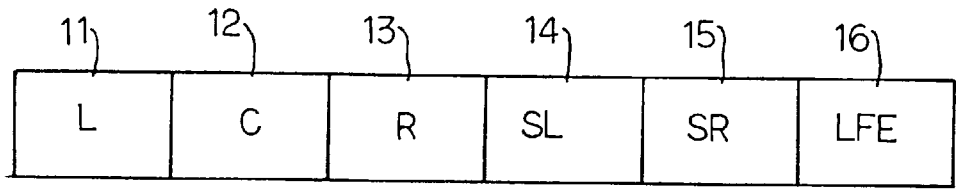
FIG. 1A is a view showing the prior art data format for the sound data without a coupling data component.
Figure 1B:
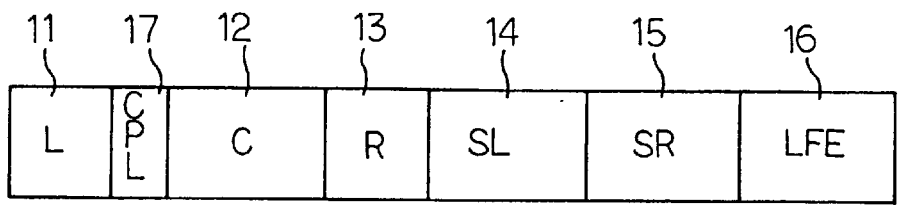
FIG. 1B is a view showing the prior art data format for the sound data containing the coupling data component.

Subsequently, the method of controlling the data buffering apparatus is detailed for the data groups shown in FIG. 1B. The compressed data group DG1 is supplied to the data expanding circuit 31 and the controlling circuit 33. At step S11, the controlling circuit 33 makes a decision to see whether or not an input data component is coupled to another data component. In this instance, the channel data group L for the left channel is coupled to the channel data group R for the right channel, and, for this reason, the data buffering apparatus 30 executes step S12. The data expanding circuit 31 expands the channel data group L for the left coupling channel, and the data components are written into the memory area 32b from the lower address toward the higher address.

The data buffering apparatus proceeds to step S13. The controlling circuit 33 makes a decision to see whether or not the left channel is the first coupling channel. In this instance, the left channel is the first coupling channel. Then, the data expanding circuit 31 expands the coupling data components of the data group CPL, and the expanded coupling data components are written in the memory area 32c from the higher address toward the lower address at step S14.

Subsequently, the channel data group C for the central channel is decided not to be the coupled channel data group at step S11, and the data expanding circuit 31 writes the channel data group C into the memory area 32a from the lower address toward the higher address.

The channel data group R for the right channel is decided to be the coupled data group at step S11, and the data expanding circuit 31 writes the channel data group R in the memory area 32b at step S12 from the lower address toward the higher address. The channel data group L has been already written into the memory area 32b, and is replaced with the channel data group R. Thus, the channel data group L is erased from the memory area 32b.

After the processing for the channel data group R, the processing is repeated until the channel data group LFE so as to write the channel data into the buffer memory 32.

The prior art data buffering apparatus writes the channel data groups into the buffer memory 20 after the data expansion of the channel data groups and the coupling channel data groups, and the prior art data buffer 20 requires a large amount of memory areas of a constant data length for the coupling channel data group and the non-coupling channel data groups. On the other hand, when a data expansion for one channel is completed, the controlling circuit 33 starts the process sequence for the next channel. Moreover, the address generating circuit 34 increments or decrements the address for the data components and the coupling data components as described hereinbefore, and seven data groups are stored in the memory areas 32a, 32b and 32c for two channels.

As will be understood from the foregoing description, the data buffering apparatus according to the present invention writes the channel data group and the coupling channel data group in the same memory area, and the buffer memory 32 is smaller than the prior art buffer memory 20. The prior art buffer memory 20 needs the memory areas for the seven channels. On the other hand, the buffer memory 32 has the memory areas only for two channels.

Although particular embodiments of the present invention have been shown and described, it will be obvious to those skilled in the art that various changes and modifications may be made without departing from the spirit and scope of the present invention. For example, the memory area 32b and the memory area 32c may be replaced with each other.

The sound data group is representative of a piece of voice, a piece of music tone and so fourth, and the data buffering apparatus may be incorporated in a stereophonic broadcasting system.

What is claimed is:

1. A data buffering apparatus for temporarily storing a plurality of channel data groups each having a plurality of channel data components representative of pieces of data information and a coupling channel data group having a coupling data component representative of one of said pieces of data information shared between at least two of said plurality of channel data groups and at least one control data component representative of a piece of control data information used for said coupling data component, comprising:

a data input port for successively receiving said plurality of channel data groups and said coupling data group;

a buffer memory having
a first memory area assigned to one of said plurality of channel data groups without said coupling data component,
a second memory area assigned to another of said plurality of channel data groups having channel data components selected from said plurality of channel data components in such a manner as to delete said coupling data component from said plurality of channel data components, and
a third memory area assigned to said coupling data group; and a data controlling means connected between said data input port and said buffer memory, checking each of said plurality of channel data groups to see whether or not said coupling data component is incorporated therein so as to write said each of said plurality of channel data group into one of said first memory area and said second memory area, and writing said coupling data group into said third memory area, said data controlling means overwriting yet another of said plurality of channel data groups into said first area already stored said one of said plurality of channel data groups when said yet another of said plurality of channel data groups does not contain said coupling data component, said data controlling means overwriting still another of said plurality of channel data groups into said second memory area already stored said another of said plurality of channel data groups when said still another of said plurality of channel data groups contains said coupling data component.

2. The data buffering apparatus as set forth in claim 1, in which said second memory area is contiguous to said third memory area, and a boundary between said second memory area and said third memory area is variable depending upon the combination of said another of said plurality of channel data groups and said coupling data group.

3. The data buffering apparatus as set forth in claim 2, in which said second memory area and said third memory area are defied by a first address to a second address and said second address to a third address, respectively, and said another of said plurality of channel data groups and said coupling data group are written from said first address toward said second address and from said third address toward said second address, respectively.

4. The data buffering apparatus as set forth in claim 3, in which said first memory area is defined by a fourth address to a fifth address, and the length between said first address and said third address is equal to the length between said fourth address and said fifth address.

5. The data buffering apparatus as set forth in claim 1, in which at least one of said plurality of channel data components has been compressed before arriving at said data input port, and said data controlling means includes a data expanding circuit connected to said data input port so as to expand said one of said plurality of channel data components.

6. The data buffering apparatus as set forth in claim 5, in which said data controlling mean further includes a controlling circuit connected to said data input port and checking each of said plurality of channel data groups and said coupling data group to see whether or not said one of said plurality of channel data components already compressed is incorporated therein, and said controlling circuit supplies a first control signal representative of existence of said one of said plurality of channel data components already compressed to said data expanding circuit.

7. The data buffering apparatus as set forth in claim 4, in which said data controlling means includes a controlling circuit discriminating each of said one of said plurality of channel data groups, said another of said plurality of channel data groups and said coupling data group from the others so as to cause an address generating circuit to supply an address signal representative of an address between said first address and said third address or between said fourth address and said fifth address to said buffer memory.

8. A method of controlling a data buffering apparatus for temporarily storing a plurality of channel data groups each having a plurality of channel data components representative of pieces of data information and a coupling channel data group having a coupling data component representative of one of said pieces of data information shared between at least two of said plurality of channel data groups and at least one control data component representative of a piece of control data information used for said coupling data component, comprising the steps of:

a) discriminating one of said plurality of channel data groups without said coupling data component, another of said plurality of channel data groups with said coupling data component and said coupling data group from the others;

b) writing said one of said plurality of channel data groups into a first memory area assigned to a channel data group without said coupling data component, a second memory area assigned to a channel data group with said coupling data component or a third memory area assigned to said coupling data group depending upon the discrimination at step a);

c) repeating said steps a) and b) until said one of said plurality of channel data groups is written into said first memory area or said one of said channel data groups and said coupling data group are written into said second memory area and said third memory area, respectively;

d) reading out said one of said plurality of channel data groups from said first memory area or said one of said plurality of channel data groups and said coupling data group from said second memory area and said third memory area; and e) repeating said step a); and f) overwriting said one of said plurality of channel data groups into said first memory area, said second memory area or said third memory area depending upon the discrimination at step e).

* * * * *